J. W. & W. A. MACFARLANE.
MOTOR FOR CENTRIFUGAL DRYING MACHINES.
APPLICATION FILED SEPT. 4, 1908.
959,567.
Patented May 31, 1910.
2 SHEETS—SHEET 1.
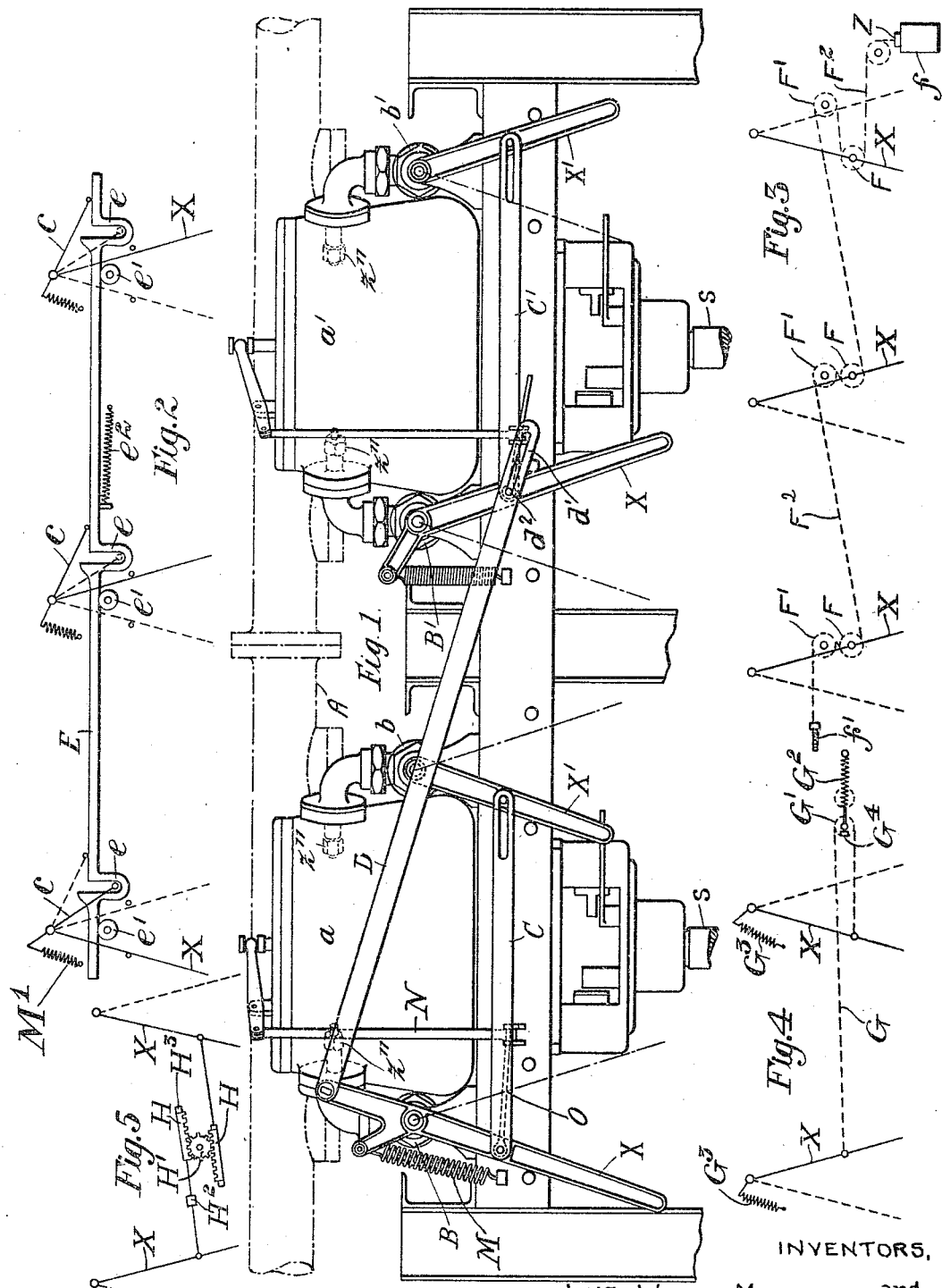
INVENTORS,
JAMES WRIGHT MACFARLANE and
WILLIAM ALLAN MACFARLANE,
by
Attorney.
WITNESSES:

J. W. & W. A. MACFARLANE.
MOTOR FOR CENTRIFUGAL DRYING MACHINES.
APPLICATION FILED SEPT. 4, 1908.
959,567.
Patented May 31, 1910.
2 SHEETS—SHEET 2.
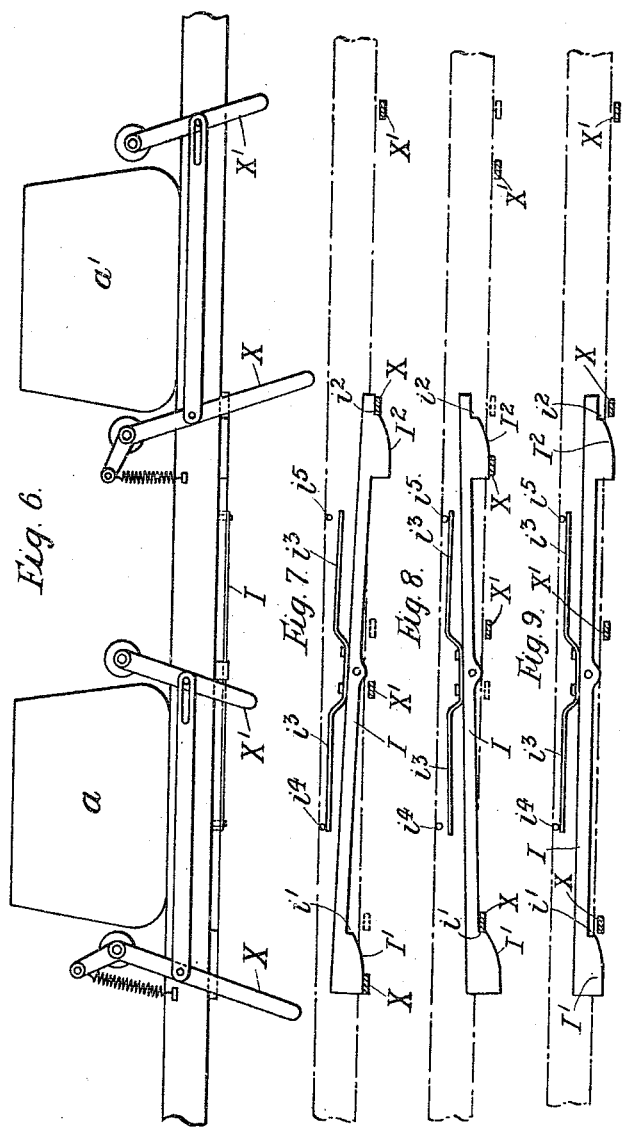
WITNESSES:
INVENTORS,
JAMES WRIGHT MACFARLANE &
WILLIAM ALLAN MACFARLANE.
by
Attorney.

UNITED STATES PATENT OFFICE.

JAMES WRIGHT MACFARLANE AND WILLIAM ALLAN MACFARLANE, OF CATHCART, SCOTLAND.

MOTOR FOR CENTRIFUGAL DRYING-MACHINES.

959,567. Specification of Letters Patent. Patented May 31, 1910.

Application filed September 4, 1908. Serial No. 451,707.

*To all whom it may concern:*

Be it known that we, JAMES WRIGHT MACFARLANE and WILLIAM ALLAN MACFARLANE, subjects of the King of the United Kingdom of Great Britain and Ireland, and residing at Cathcart, Renfrewshire, Scotland, have invented a certain new and useful Improvement in Motors for Centrifugal Drying-Machines, of which the following is a specification.

In an installation of two or more centrifugal drying machines actuated by fluid pressure from any steam driven pump having an automatic steam regulator for insuring within limits an approximately constant pressure in the pump the speed of the pump will vary according to the amount of water required at any given time, and, as the amount of water required to accelerate a centrifugal drying machine to full speed is usually much greater than what is required to maintain full speed after that speed has been reached, it follows that the speed of the pump will reach a maximum when all the machines are being accelerated to full speed at the same time. On the other hand, if only some of the machines are accelerated to full speed at the same time, when others are running full speed and some are stopping or stopped, it is evident that the speed of the pump will be less and will, under usual working conditions, be practically steady when all the machines are working in regular rotation.

The object of the arrangements forming the subject of this invention is to insure that the speed of the pump will be kept within limits and prevented from exceeding a normal which is considerably less than that required when all the machines are accelerated to full speed at the same time.

In the accompanying drawings Figure 1 is an elevation of part of two centrifugal drying machines adapted to be actuated by water pressure and showing an arrangement for interlocking the valves for the water supply to the nozzles of the motors actuating the machines with a view to realizing the object of the invention. Figs. 2 to 9 show alternative arrangements.

In the installation of two machines shown in Fig. 1, $s, s$, are the spindles of the centrifugal drying machines and $a, a'$ are the water motors actuating the said spindles $s, s$.

A is the main water supply pipe.

Each of the two machines is provided with a water valve B or B′ which is called the accelerating valve and with a valve $b$ or $b'$, termed the maintaining valve, said valves controlling the water supply to the nozzles $z''$ of the water motors which drive the machines: When a machine is started, both valves B and $b$ for that machine are opened together to accelerate the machine rapidly up to full speed, the accelerating valve B being thereafter shut automatically by the action of the spring M when the governor rod N rises to clear the trigger rod O on the motor attaining full speed, as explained in the specifications of Letters Patent Nos. 753,155, and 876,368. The starting lever X on each accelerating valve is connected to the lever X′ on the maintaining valve by a slotted link C or C′ arranged to permit the accelerating valve to be shut without closing the maintaining valve, the machine being finally stopped by manually shutting the maintaining valve $b$ by putting the stopping lever X′ into the closed position.

In order to interlock the starting levers X, X, a slotted connection D is made between the starting valve lever X of the machines so that on the starting levers X of the motor $a$ being brought to the open position shown, the starting lever X of the other motor $a'$ cannot be actuated while the lever X of the motor $a$ remains in open position.

It will be understood that when the accelerating lever for the motor $a$ is moved to the left, the slot $d'$ in the link D is brought up against the pin $d^2$ on the accelerating lever X for the motor $a'$ so that the lever X for said motor $a'$ cannot be moved to the left to start the motor $a'$. It will also be understood that the levers X, X′ of the motor $a$ are shown in full lines in the position they occupy when the valves B, $b$ are both open; the dotted lines indicating the positions occupied by said levers when said valves are closed. The levers X, X′ of the motor $a'$ are shown in full lines in the position occupied when the valves B′, $b'$ of the motor $a'$ are both closed; while the dotted lines indicate the positions occupied by said levers when the valves are open.

In the modified arrangement applied to an installation of three centrifugal machines represented at Fig. 2, a bar E with depressions $e$ is mounted on rollers $e'$ and is movable to the left against the power of a spring $e^2$ when actuated by the outer end of a spring-held arm $c$ of the starting lever X provided on each machine, each of which arms, when all the machines are stopped, and the bar is in its extreme right hand position, is opposite a depression $e$ in said bar. When the bar has been moved to the left by the arm $c$ of one machine (Fig. 2 shows the bar E as having been so moved by the arm $c$ of the extreme left hand machine, which arm has dropped into the depression $e$ at the left hand end of the bar) the arms of the other machines rest on the straight portion of the bar and cannot enter the other depressions $e$ so that such machines being stopped cannot be restarted until the bar E is again moved to the right by the action of the spring $e^2$, namely when the extreme left hand machine is stopped and the arm $c$ lifted out of the depression $e$ by the spring M'.

In the arrangement represented at Fig. 3 on the starting levers X are mounted wheels F around which and stationary wheels F' a cord or chain $F^2$ passes, one end of which latter has secured to it a balance weight $f$ or tensioning device while the other end of said cord or chain is fixed and is provided with an adjusting device $f'$. The extreme right hand starting lever X is shown in open position while the other two levers are in locked position. It will be understood that when the starting lever of one machine is in open position, the slack of the cord or chain will be fully taken up when the weight $f$ or tensioning device comes against a stop Z and it is impossible to actuate the levers of the other machines.

An arrangement is shown applied to two centrifugal machines at Fig. 4, wherein a cord or chain G is attached to one starting lever X, passes around a sliding pulley G' held by a spring $G^2$ and is then attached to the other starting lever. In addition to or in lieu of the spring $G^2$ separate springs $G^3$ may be employed as hitherto to bring each of the starting levers to the closed position. The right hand lever is shown in open position and the other is in the closed position and locked by means of a stop $G^4$.

In the arrangement shown in Fig. 5 which is applied to two centrifugal machines, each of the starting levers X has attached to it a toothed rack H gearing with a toothed pinion H' mounted on the frame of the machine, the upper rack H being mounted on its rod so as to slide between an inner stop $H^2$ and a stop $H^3$ at the outer end of its rod, so as to permit the necessary independent movement of the levers X.

In the diagrams Figs. 2, 3, 4 and 5, the maintaining valve levers are not shown.

In the arrangement shown applied to two centrifugal machines in Figs. 6 to 9, inclusive, there is provided a pivoted locking lever I having cam-like end portions I', $I^2$ with shoulders $i'$, $i^2$ and spring-like arms $i^3$ adapted to contact with stops $i^4$, $i^5$. Fig. 9 shows the levers X, X' of each machine $a$, $a'$ in normal position. Figs. 6 and 7 show the said levers of machine $a$ moved to the open position, the lever X contacting with the portion I' to cause one of the spring-like arms $i^3$ to press against the stop $i^4$, and the shoulder $i^2$ engaging the starting lever X of the machine $a'$ to lock the same.

Fig. 8 shows the starting lever X of the machine $a'$ moved to open position and the starting lever of the machine $a$ locked.

It will be understood that either of the two levers for each machine may be the starting lever, and so adapted to be locked.

Having now described our invention what we claim and desire to secure by Letters Patent of the United States is:—

1. An installation comprising a plurality of motors rotated by fluid under pressure, nozzles for supplying jets of fluid to said motors, and valves controlling the passage of fluid through said nozzles, said valves provided with means arranged to permit the passage of fluid through a fraction only of the total number of nozzles at the same time.

2. An installation comprising a plurality of motors rotated by fluid under pressure, nozzles for supplying jets of fluid to said motors, and connected valves controlling the passage of fluid through said nozzles, said valves and the connections being arranged to permit the passage of fluid through a fraction only of the total number of nozzles at the same time.

3. An installation comprising a plurality of motors rotated by fluid under pressure, nozzles for supplying jets of fluid to said motors, valves controlling the passage of fluid through said nozzles, and devices for interlocking the valves constructed and arranged to permit only a fraction of the total number of nozzles to be open at the same time.

4. An installation comprising a plurality of motors rotated by fluid under pressure, an accelerating and a maintaining valve for controlling the jets for each motor, levers on said valves, connections between the levers on the valves of each motor, and a connection between the accelerating valves of different motors constructed and arranged to permit a fraction only of the total number of accelerating jets to be in operation at the same time.

5. An installation comprising a plurality of motors rotated by fluid under pressure, valves controlling the supply of fluid to said motors and devices for interlocking the valves constructed and arranged to permit only a fraction of the total number of valves to be open at the same time.

6. An installation comprising a plurality of motors rotated by fluid under pressure, an accelerating and a maintaining valve for each motor, levers on said valves, connections between the levers on the valves of each motor, and a connection between the accelerating valves of different motors constructed and arranged to prevent the connected accelerating valves from being all open at the same time.

In testimony whereof we have signed our names to this specification in the presence of two subscribing witnesses.

JAMES WRIGHT MACFARLANE.
WILLIAM ALLAN MACFARLANE.

Witnesses:
WALLACE CRANSTON FAIRWEATHER,
JNO. ARMSTRONG, Jr.